US012358378B2

United States Patent
Jiang et al.

(10) Patent No.: US 12,358,378 B2
(45) Date of Patent: Jul. 15, 2025

(54) INTEGRATED ELECTROMAGNET AND MAGLEV TRAIN

(71) Applicant: CRRC QINGDAO SIFANG CO., LTD., Shandong (CN)

(72) Inventors: Fujie Jiang, Shandong (CN); Weitao Han, Shandong (CN); Guimei Deng, Shandong (CN); Donghua Wu, Shandong (CN); Changfeng Yang, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 729 days.

(21) Appl. No.: 17/760,770

(22) PCT Filed: Jan. 26, 2021

(86) PCT No.: PCT/CN2021/073747
§ 371 (c)(1),
(2) Date: Mar. 16, 2022

(87) PCT Pub. No.: WO2021/190118
PCT Pub. Date: Sep. 30, 2021

(65) Prior Publication Data
US 2022/0340014 A1    Oct. 27, 2022

(30) Foreign Application Priority Data

Mar. 23, 2020   (CN) .......................... 202010211874.7

(51) Int. Cl.
*B60L 13/06*    (2006.01)
*B61H 7/08*    (2006.01)
*H01F 7/06*    (2006.01)

(52) U.S. Cl.
CPC ................ *B60L 13/06* (2013.01); *B61H 7/08* (2013.01); *H01F 7/06* (2013.01); *B60L 2200/26* (2013.01); *B60Y 2200/30* (2013.01)

(58) Field of Classification Search
CPC ....... B60L 13/06; B60L 2200/26; B61H 7/08; H01F 7/06; B60Y 2200/30
See application file for complete search history.

(56) References Cited

U.S. PATENT DOCUMENTS 5,602,430 A  *  2/1997  Kalsi ....................... B60L 13/06
                                                          104/286
8,250,990 B2 *  8/2012  Kunz ........................ B60L 7/28
                                                          104/282

(Continued)

FOREIGN PATENT DOCUMENTS

CN        1792664 A       6/2006
CN     101528501 A  *  9/2009  .............. B60L 13/03

(Continued)

OTHER PUBLICATIONS

International Search Report for PCT/CN2021/073747 mailed Mar. 11, 2021 , ISA/CN.

(Continued)

*Primary Examiner* — Jason C Smith
(74) *Attorney, Agent, or Firm* — Yue (Robert) Xu; Apex Attorneys at Law, LLP

(57) ABSTRACT

An integrated electromagnet comprises a magnetic yoke and magnetic poles in two rows. An axis of magnetic core in the magnetic pole is perpendicular to the magnetic yoke. The magnetic poles comprise first and second magnetic poles that are arranged alternatively in a row. The first magnetic pole in any row is adjacent to the second magnetic pole in the other row. The first magnetic poles in a row are connected to a one-way output controller and the second magnetic poles in a row are connected to a bidirectional output (Continued)

controller. In a guiding state, the magnetic poles in a row have a same polarity, and a polarity of the magnetic poles in one row is opposite to that in the other row; current output by the bidirectional output controller in a braking state has direction opposite to current output by the bidirectional output controller in the guiding state.

8 Claims, 8 Drawing Sheets

(56) References Cited

U.S. PATENT DOCUMENTS

| | | | | |
|---|---|---|---|---|
| 12,179,603 | B2 * | 12/2024 | Hussey | .................. H02N 15/00 |
| 2008/0257662 | A1 * | 10/2008 | Kunz | ........................ B60L 7/28 |
| | | | | 188/165 |
| 2010/0031846 | A1 * | 2/2010 | Loser | ..................... B60L 13/08 |
| | | | | 104/281 |
| 2022/0340014 | A1 * | 10/2022 | Jiang | ........................ H01F 3/10 |

FOREIGN PATENT DOCUMENTS

| | | | | | |
|---|---|---|---|---|---|
| CN | 101985283 | A | * | 3/2011 | |
| CN | 105305776 | A | * | 2/2016 | |
| CN | 205160339 | U | | 4/2016 | |
| CN | 106347407 | A | | 1/2017 | |
| CN | 109300649 | A | * | 2/2019 | |
| CN | 111267630 | A | * | 6/2020 | .............. B60L 13/06 |
| CN | 116788054 | A | * | 9/2023 | |
| CN | 221476754 | U | * | 8/2024 | |
| GB | 2189087 | A | * | 10/1987 | ............. H02K 21/28 |
| JP | H0686576 | A | * | 3/1994 | |
| JP | 2001231111 | A | | 8/2001 | |
| JP | 2006199170 | A | * | 8/2006 | |
| JP | 2008220118 | A | * | 9/2008 | |
| JP | 4757816 | B2 | * | 8/2011 | |

OTHER PUBLICATIONS

The European search report mailed Apr. 25, 2024 for EP21776745.8.

The Japanese 1st Office Action mailed Jan. 30, 2023 for JP2022-507437.

* cited by examiner

INTEGRATED ELECTROMAGNET AND MAGLEV TRAIN

This application is the national phase of International Application No. PCT/CN2021/073747, titled "INTEGRATED ELECTROMAGNET AND MAGLEV TRAIN", filed on Jan. 26, 2021, which claims priority to Chinese Patent Application No. 202010211874.7, titled "INTEGRATED ELECTROMAGNET AND MAGLEV TRAIN", filed on Mar. 23, 2020 with the China National Intellectual Property Administration, which are incorporated herein by reference in their entireties.

FIELD

The present disclosure relates to the technical field of maglev trains, and in particular, to an integrated electromagnet and a maglev train.

BACKGROUND

Currently, a high-speed maglev train in China has a maximum running speed of 503 km/h, and higher guiding capability and braking capability are required under high-speed running. At present, the guiding function and emergency braking function of the high-speed maglev train are realized by a guiding electromagnet and a brake electromagnet respectively.

In the conventional technology, two brake electromagnets and eight brake controllers are usually installed in each carriage. But the usage rate of this brake system is extremely low. The brake system is activated only when a serious failure occurs in the train. However, even if the brake system is not activated under normal operation of the train, it is still equipped with a power supply system, a controller and a brake electromagnet, which cause serious waste of resources, that is, a large amount of mechanical space is occupied, the weight of the train is increased, and the required capacity of the power supply system is also increased. Therefore, it is a problem to be solved by those skilled in the art to provide an integrated electromagnet, to solve the problem of resource waste of brake electromagnets.

SUMMARY

An objective of the present disclosure is to provide an integrated electromagnet which can reduce the waste of brake electromagnet resources by combining the guiding function and the braking function together. Another objective of the present disclosure is to provide a maglev train which can reduce the waste of brake electromagnet resources by combining the guiding function and the braking function together.

To solve the above technical problems, an integrated electromagnet is provided according to the present disclosure. The integrated electromagnet includes a magnetic yoke and magnetic poles in two rows that are located on a surface of the magnetic yoke facing a guide plate, the magnetic poles in one row correspond to the magnetic poles in the other row one by one, and an axis of a magnetic core in the magnetic pole is perpendicular to the surface of the magnetic yoke facing the guide plate;

where the magnetic poles include a first magnetic pole and a second magnetic pole, the first magnetic pole and the second magnetic pole in a row are arranged alternatively, the first magnetic pole in any row is adjacent to the second magnetic pole in the other row, the first magnetic poles in a row are connected in series with each other and connected to a one-way output controller, and the second magnetic poles in a row are connected in series with each other and connected to a bidirectional output controller; and where in a guiding state, the magnetic poles in a row have a same polarity, and a polarity of the magnetic poles in one row is opposite to a polarity of the magnetic poles in the other row; a current output by the bidirectional output controller in a braking state has a direction opposite to a current output by the bidirectional output controller in the guiding state.

Optionally, the first magnetic pole and the second magnetic pole in a row are alternately arranged one by one.

Optionally, the number of the magnetic poles in a row is an even number.

Optionally, a wear plate is provided on a surface of the magnetic poles facing the guide plate.

Optionally, the magnetic yoke is fixedly connected with three load-bearing battens, the three load-bearing battens are parallel to each other, and an axis of the load-bearing batten is parallel to an arrangement direction of the magnetic poles in a row.

Optionally, a back box is provided on a side of the magnetic yoke facing away from the guide plate, and the back box is fixedly connected to the load-bearing battens.

Optionally, the integrated electromagnet further includes Y-direction connection subassemblys, and each Y-direction connection subassembly is simultaneously fixedly connected to surfaces of the three load-bearing battens facing away from the guide plate.

Optionally, a cross section of the magnetic pole along a direction perpendicular to the axis of the magnetic core is in a rounded square shape, and the magnetic pole includes the magnetic core, a winding, an insulating layer, a short interface and a long interface;

where the insulating layer covers a side wall of the insulating layer, and the winding is wound around the magnetic core along a surface of the insulating layer facing away from the magnetic core; the short interface is electrically connected to one port of the winding, the long interface is electrically connected to the other port of the winding, and both the short interface and the long interface extend to one end surface of the magnetic pole along the axis of the magnetic core.

Optionally, the cross section of the magnetic core along a direction perpendicular to the axis of the magnetic core is in a chamfered square shape, and the magnetic pole further includes an insulating support block; where the insulating support block is located at four corners of the magnetic core, and the insulating layer covers the magnetic core and the insulating support block.

A maglev train is provided according to the present disclosure, including any one of the above-mentioned integrated electromagnets.

The integrated electromagnet according to the present disclosure includes a magnetic yoke and magnetic poles in two rows that are located on a surface of the magnetic yoke facing a guide plate, the magnetic poles in one row correspond to the magnetic poles in the other row one by one, and an axis of a magnetic core in the magnetic pole is perpendicular to the surface of the magnetic yoke facing the guide plate. The magnetic poles include a first magnetic pole and a second magnetic pole, the first magnetic pole and the second magnetic pole in a row are arranged alternatively, the first magnetic pole in any row is adjacent to the second magnetic pole in the other row, the first magnetic poles in a row are connected in series with each other and connected to a one-way output controller, and the second magnetic poles in a row are connected in series with each other and connected to a bidirectional output controller. In a guiding state, the magnetic poles in a row have a same polarity, and a polarity of the magnetic poles in one row is opposite to a polarity of the magnetic poles in the other row; a current output by the bidirectional output controller in a braking state has a direction opposite to a current output by the bidirectional output controller in the guiding state.

In the normal guiding state, a magnetic field is generated between adjacent magnetic poles in different rows due to their different polarities, thus a guiding force with a direction perpendicular to a forwarding direction of the train is generated between the magnetic poles and the guiding plate for guiding. When a braking operation is required, the bidirectional output controller outputs a reverse current, and in this case the polarity of the second magnetic pole will be reversed. Since the first magnetic pole in any row is adjacent to the second magnetic pole in the other row, and the first magnetic pole and the second magnetic pole in a row are alternately arranged, alternate polarities N and S along the forwarding direction of the train are formed, and a magnetic field is generated, thus a braking force for braking the train is generated. During the braking operation, polarities of adjacent magnetic poles in different rows become the same, thus no interference will occur. In this way, by integrating the braking function and the guiding function into one integrated electromagnet, resource waste of brake electromagnets can be greatly reduced.

A maglev train is provided according to the present disclosure, and the maglev train also has the above-mentioned beneficial effects, which will not be described herein.

BRIEF DESCRIPTION OF THE DRAWINGS

In order to more clearly illustrate technical solutions in embodiments of the present disclosure or in the conventional technology, drawings used in the description of the embodiments or the conventional technology are introduced briefly hereinafter. Apparently, the drawings described in the following illustrate some embodiments of the present disclosure, and other drawings may be obtained by those ordinarily skilled in the art based on these drawings without any creative efforts.

In the Figures.

Figure 1:
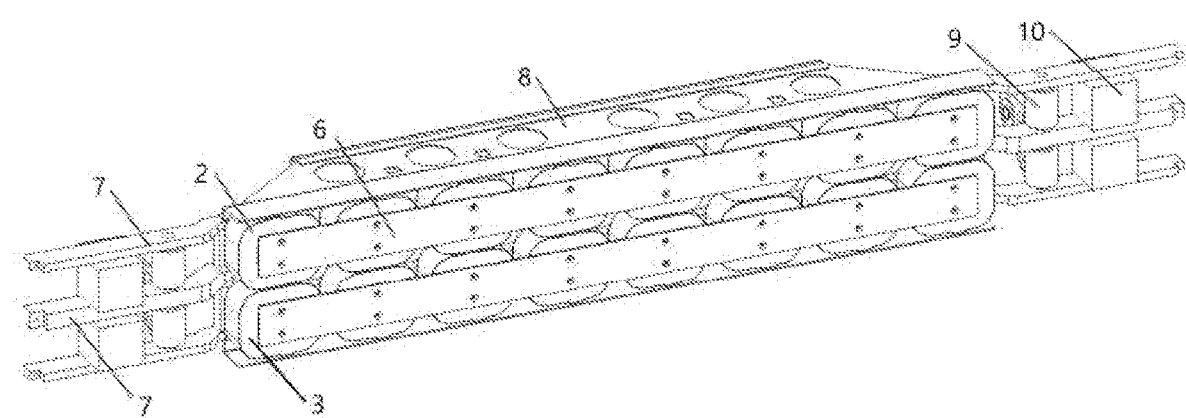
FIG. 1 is a schematic structural diagram of an integrated electromagnet according to an embodiment of the present disclosure.

| | |
|---|---|
| 1: Magnetic yoke; | 2: First magnetic pole; |
| 3: Second magnetic pole; | 4: One-way output controller; |
| 5: Bidirectional output controller; | 6: Wear plate; |
| 7: Load-bearing batten; | 8: Back box; |
| 9: Y-direction connection subassembly; | |
| 10: Gap sensor; | |
| 11: Guide plate; | 21: Magnetic core; |
| 22: Insulating layer; | 23: Winding; |
| 24: Short interface; | 25: Long interface; |
| 26: Insulating support block. | |

DETAILED DESCRIPTION

The present disclosure aims to provide an integrated electromagnet. In the conventional technology, two brake electromagnets and eight brake controllers are usually installed in each carriage. But the usage rate of this brake system is extremely low. The brake system is activated only when a serious failure occurs in the train. However, even if the brake system is not activated under normal operation of the train, it is still equipped with a power supply system, a controller and a brake electromagnet, which cause serious waste of resources, that is, a large amount of mechanical space is occupied, the weight of the train is increased, and the required capacity of the power supply system is also increased.

The integrated electromagnet according to the present disclosure includes a magnetic yoke and magnetic poles in two rows that are located on a surface of the magnetic yoke facing a guide plate, the magnetic poles in one row correspond to the magnetic poles in the other row one by one, and an axis of a magnetic core in the magnetic pole is perpendicular to the surface of the magnetic yoke facing the guide plate. The magnetic poles include a first magnetic pole and a second magnetic pole, the first magnetic pole and the second magnetic pole in a row are arranged alternatively, the first magnetic pole in any row is adjacent to the second magnetic pole in the other row, the first magnetic poles in a row are connected in series with each other and connected to a one-way output controller, and the second magnetic poles in a row are connected in series with each other and connected to a bidirectional output controller. In a guiding state, the magnetic poles in a row have a same polarity, and a polarity of the magnetic poles in one row is opposite to a polarity of the magnetic poles in the other row; a current output by the bidirectional output controller in a braking state has a direction opposite to a current output by the bidirectional output controller in the guiding state.

In the normal guiding state, a magnetic field is generated between adjacent magnetic poles in different rows due to their different polarities, thus a guiding force with a direction perpendicular to a forwarding direction of the train is generated between the magnetic poles and the guiding plate for guiding. When a braking operation is required, the bidirectional output controller outputs a reverse current, and in this case the polarity of the second magnetic pole will be reversed. Since the first magnetic pole in any row is adjacent to the second magnetic pole in the other row, and the first magnetic pole and the second magnetic pole in a row are alternately arranged, alternate polarities N and S along the forwarding direction of the train are formed, and a magnetic field is generated, thus a braking force for braking the train is generated. During the braking operation, polarities of adjacent magnetic poles in different rows become the same, thus no interference will occur. In this way, by integrating the braking function and the guiding function into one integrated electromagnet, resource waste of brake electromagnets can be greatly reduced.

In order to make those skilled in the art understand the technical solutions of the present disclosure better, the technical solutions in the present disclosure are described in detail below in conjunction with the drawings and the embodiments of the present disclosure. Apparently, the described embodiments are only a part of the embodiments of the present disclosure, rather than all embodiments. Based on the embodiments in the present disclosure, all of other embodiments, made by the person skilled in the art without any creative efforts, fall into the scope of protection of the present disclosure.

Figure 2:
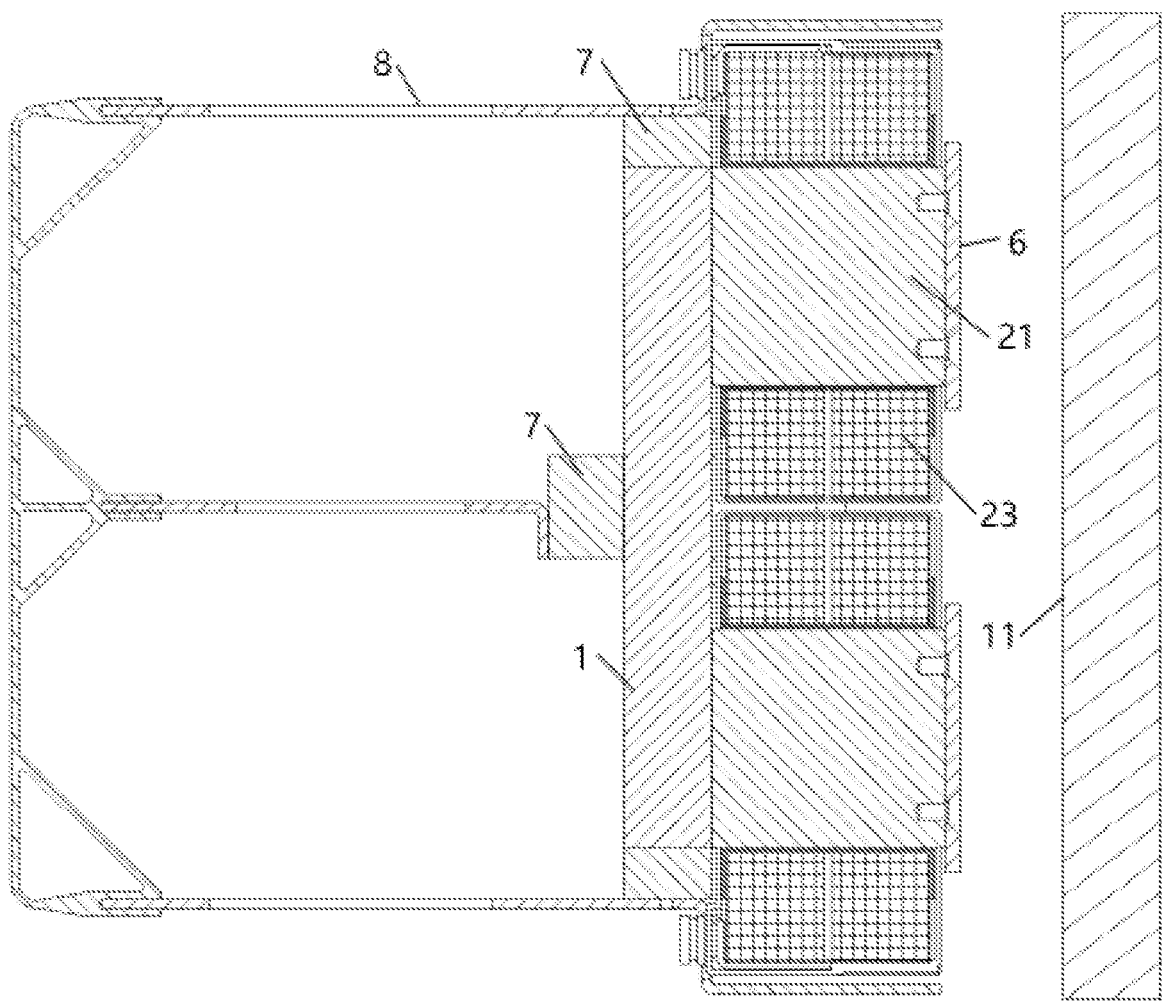
FIG. 2 is a cross-sectional view of FIG. 1.
Figure 3:
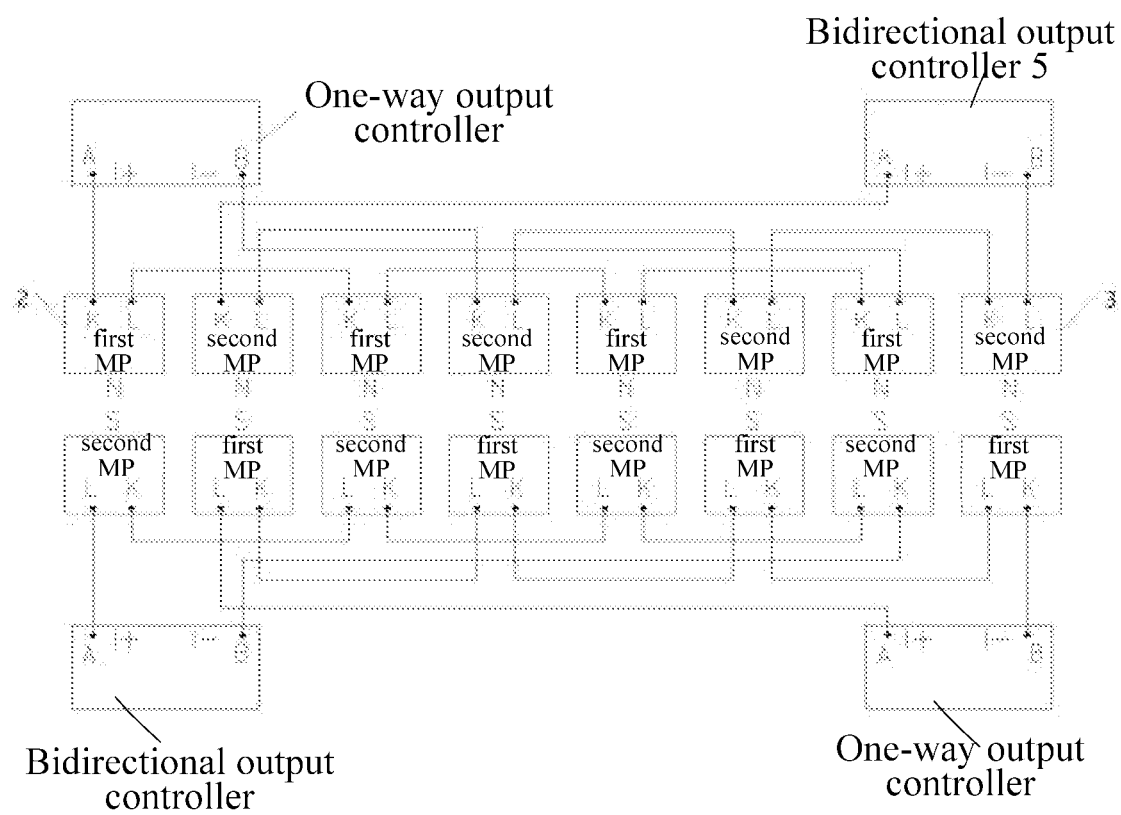
FIG. 3 is a diagram of a power supply circuit in a guiding state according to an embodiment of the present disclosure.
Figure 4:
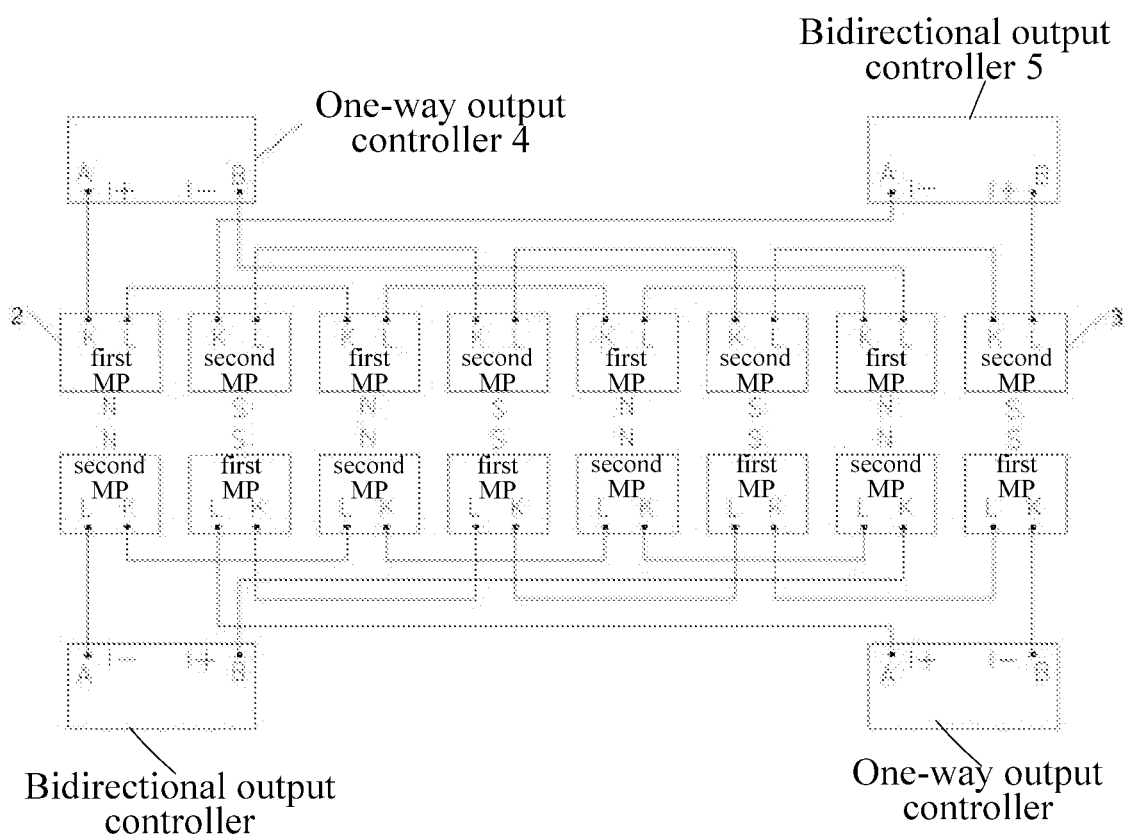
FIG. 4 is a of a power supply circuit in a braking state according to an embodiment of the present disclosure.
Figure 5:
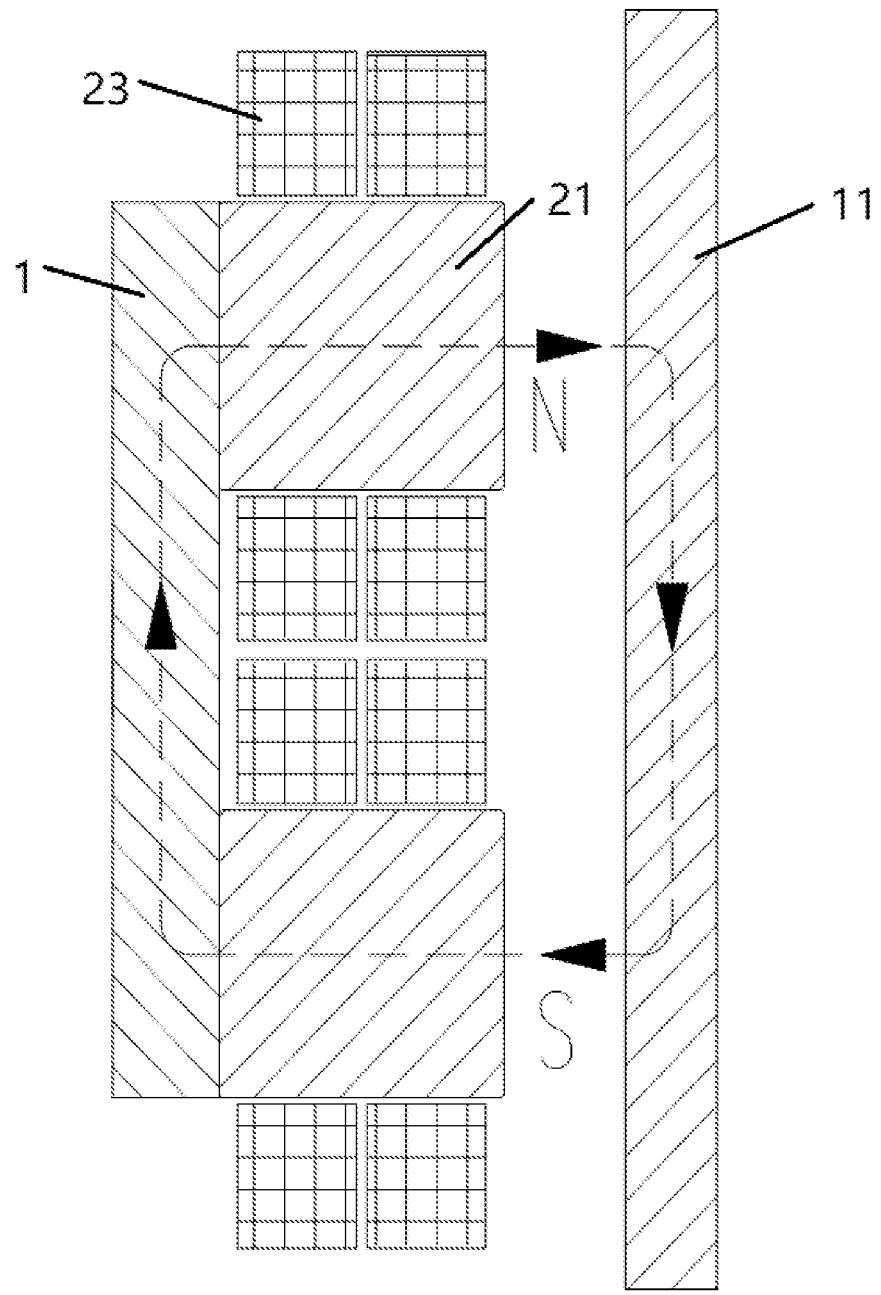
FIG. 5 is a diagram of a magnetic path in a guiding state according to an embodiment of the present disclosure.
Figure 6:
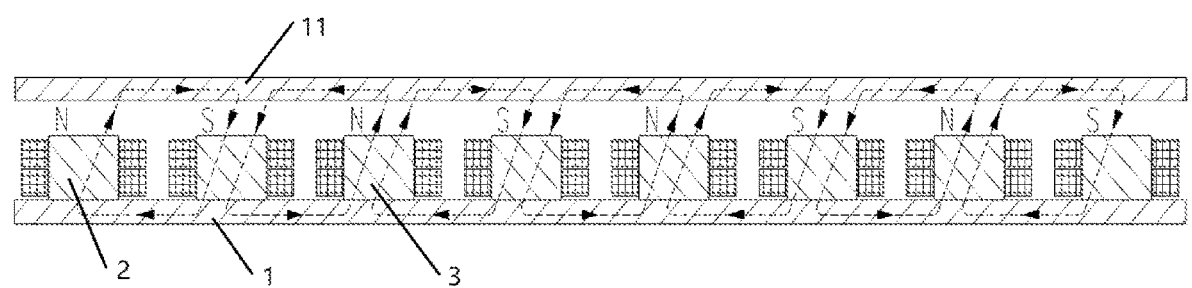
FIG. 6 is a diagram of a magnetic path in a braking state according to an embodiment of the present disclosure.
Figure 7:
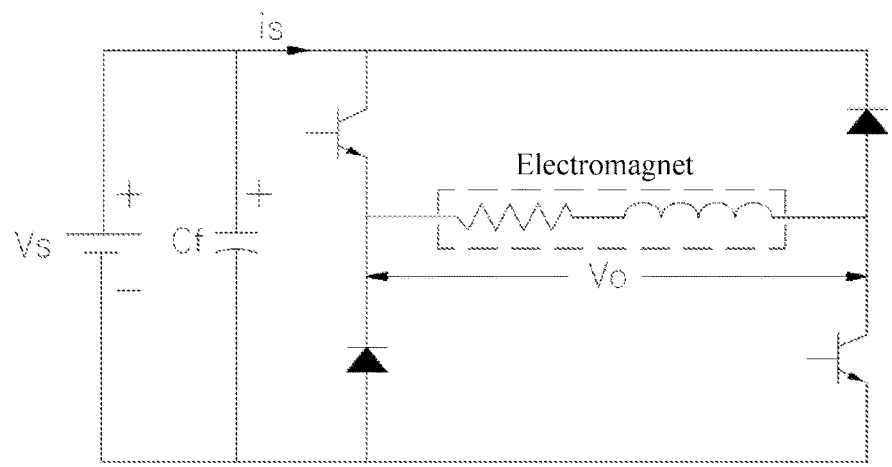
FIG. 7 is a principle diagram of power supply of a one-way output controller according to an embodiment of the present disclosure.
Figure 8:
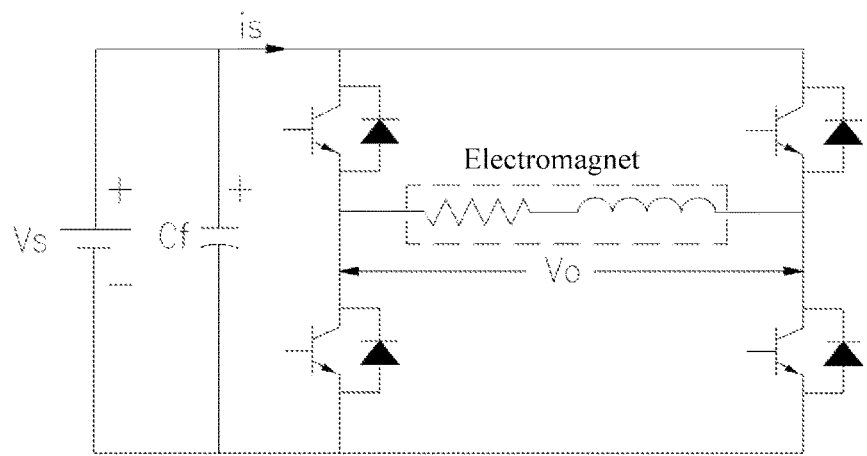
FIG. 8 is a principle diagram of power supply of a bidirectional output controller according to an embodiment of the present disclosure.

Reference is made to FIGS. 1 to 8, in which FIG. 1 is a schematic structural diagram of an integrated electromagnet according to an embodiment of the present disclosure, FIG. 2 is a cross-sectional view of FIG. 1, FIG. 3 is a diagram of a power supply circuit in a guiding state, FIG. 4 is a diagram of a power supply circuit in a braking state, FIG. 5 is a diagram of a magnetic path in a guiding state, FIG. 6 is a diagram of a magnetic path in a braking state, FIG. 7 is a principle diagram of power supply of a one-way output controller, and FIG. 8 is a principle diagram of power supply of a bidirectional output controller.

Reference is made to FIGS. 1 and 2, in an embodiment of the present disclosure, an integrated electromagnet includes a magnetic yoke 1 and magnetic poles in two rows that are located on a surface of the magnetic yoke 1 facing a guide plate 11, the magnetic poles in one row correspond to the magnetic poles in the other row one by one, and an axis of a magnetic core 21 in the magnetic pole is perpendicular to the surface of the magnetic yoke 1 facing the guide plate 11. The magnetic poles include a first magnetic pole 2 and a second magnetic pole 3, the first magnetic pole 2 and the second magnetic pole 3 in a row are arranged alternatively, the first magnetic pole 2 in any row is adjacent to the second magnetic pole 3 in the other row, the first magnetic poles 2 in a row are connected in series with each other and connected to a one-way output controller 4, and the second magnetic poles 3 in a row are connected in series with each other and connected to a bidirectional output controller 5. In a guiding state, magnetic poles in a row have a same polarity, and a polarity of magnetic poles in one row is opposite to a polarity of magnetic poles in the other row; a current output by the bidirectional output controller 5 in a braking state has a direction opposite to a current output by the bidirectional output controller in the guiding state.

The magnetic yoke 1 is made of a magnetic conductive material, thus the magnetic yoke 1 can be magnetically permeable to form a magnetic path. In an embodiment of the present disclosure, the magnetic yoke 1 is usually made of steel of magnetic conductive structure. The material of the magnetic yoke 1 is not limited in the embodiment of the present disclosure, as long as it has good magnetic permeability and enough mechanical strength, depending on specific situations.

The magnetic poles are located on the surface of the magnetic yoke 1 facing the guide plate 11, thus a magnetic attraction force generated between the magnetic poles and the guide plate 11 is transmitted to the magnetic yoke 1 first, and then to other components through the magnetic yoke 1. Correspondingly, in an embodiment of the present disclosure, the magnetic yoke 1 usually has a certain structural strength. A specific structure of the magnetic pole will be described in detail in following embodiments of the present disclosure, which will not be described here. In the embodiment of the present disclosure, the magnetic poles are distributed in two rows, and the magnetic poles in one row correspond to the magnetic poles in the other row one by one. That is, the quantities of the magnetic poles in the two rows are equal, and any magnetic pole in one row is adjacent to a magnetic pole in the other row. In the embodiment of the present disclosure, the axis of the magnetic core 21 in the magnetic pole is perpendicular to the surface of the magnetic yoke 1 facing the guide plate 11, thus a magnetic field pointing from the magnetic yoke 1 to the guide plate 11 is generated when the magnetic poles operates.

Reference is made to FIGS. 3 and 4, the magnetic poles include a first magnetic pole 2 and a second magnetic pole 3. It should be noted that in the embodiment of the present disclosure, structures of the first magnetic pole 2 and the second magnetic pole 3 are generally the same, and the difference is that the first magnetic pole 2 and the second magnetic pole 3 are connected to different types of controllers. The first magnetic pole 2 and the second magnetic pole 3 in a row are arranged alternatively, and the first magnetic pole 2 in any row is adjacent to the second magnetic pole 3 in the other row. The first magnetic poles 2 in any row are connected in series with each other and connected to a one-way output controller 4, and the one-way output controller 4 outputs current in only one direction, that is, the polarity of the first magnetic poles 2 will not change in the embodiment of the present disclosure. The second magnetic poles 3 in any row are connected in series and are connected to a bidirectional output controller 5. The bidirectional output controller 5 outputs current from two directions, that is, the pole of the second electrodes may change in the embodiment of the disclosure. Generally, in the embodiment of the present disclosure, the integrated electromagnet is connected to four controllers, i.e., two one-way output controllers 4 and two bidirectional output controllers 5.

Reference is made to FIGS. 5 and 6, in an embodiment of the present disclosure, the integrated electromagnet has a guiding state and a braking state during operation. In the guiding state, the polarities of magnetic poles in the same row are set to be the same, and the polarities of the magnetic poles in one row are opposite to the polarities of the magnetic poles in the other row, thus a magnetic field in a direction perpendicular to the axis of the integrated electromagnet is generated between the two rows of magnetic poles, that is, a magnetic field in a direction perpendicular to a moving direction of the integrated electromagnet is generated. The magnetic field passes through one magnetic pole in one row, an air gap between the magnetic pole and the guide plate 11, the guide plate 11, an air gap between the guide plate 11 and the magnetic pole, the adjacent magnetic pole in the other row, the magnetic yoke 1, and then back to the magnetic pole in turn, to form a magnetic path. The magnetic path generated between different rows of magnetic poles will generate a magnetic attraction force with the guide plate 11, and a magnitude of the magnetic attraction force may be changed by controlling the magnetic field, thereby realizing the guiding function.

Reference is made to FIGS. 7 and 8, in the embodiment of the present disclosure, a direction of a current output by the bidirectional output controller 5 in the braking state is opposite to a direction of a current output in the guiding state. When the train needs to stop urgently, that is, when it needs to be in the braking state, the bidirectional output controller 5 will output a reverse current compared to that in the guiding state, and thus the polarity of the second magnetic poles 3 will also be reversed. At this time, since the first magnetic poles 2 and the second magnetic poles 3 in the same row are alternately arranged, alternated polarities N and S of the magnetic poles in the same row are formed. Further, since the first magnetic pole 2 in any row is adjacent to the second magnetic pole 3 in the other row, and the polarities of the adjacent magnetic poles in different rows are opposite in the guiding state, in this case the polarities of the adjacent magnetic poles in different rows are the same in the braking state, thus a magnetic field propagating in the direction of the magnetic pole arrangement is formed. Therefore in the braking state, the magnetic field passes through one magnetic pole, an air gap between the magnetic pole and the guide plate 11, the guide plate 11, an air gap between the guide plate 11 and an adjacent magnetic pole in the same row, the adjacent magnetic pole, the magnetic yoke 1, and back to the original magnetic pole in turn, to form a magnetic path. Since the polarities N and S of the two rows of magnetic poles alternates in the running direction of the train, an eddy current is generated in the guide plate 11 when the train is running due to the magnetic field alternating, thus an air gap magnetic flux between the two rows of magnetic poles and the guide plate 11 lags, that is, the magnetic field is tilted to a certain extent. A component of the tilted magnetic field in the running direction produces a braking force to realize a braking function, which is also known as eddy current braking function, to achieve braking.

Generally, the first magnetic pole 2 and the second magnetic pole 3 in the same row are alternately arranged one by one, to form a more dense magnetic field between the first magnetic pole 2 and the second magnetic pole 3 in the braking state, and the magnetic field formed between the first magnetic pole 2 and the second magnetic pole 3 will generate a braking force with the guide plate 11, that is, by alternately arranging the first magnetic pole 2 and the second magnetic pole 3 in the same row one by one, a stronger braking force can be generated.

In the embodiment of the present disclosure, the quantity of the magnetic poles in the same row is usually an even number, and the quantity of the first magnetic poles 2 and the quantity of the second magnetic poles 3 in the same row are usually equal. In the embodiment of the present disclosure, the quantity of the magnetic poles in each row is eight, and a total of sixteen magnetic poles are provided. Alternatively, there may be other quantity of magnetic poles, which is not limited in the embodiment of the present disclosure.

The integrated electromagnet in the embodiment of the present disclosure includes a magnetic yoke 1 and magnetic poles in two rows that are located on a surface of the magnetic yoke 1 facing a guide plate 11, the magnetic poles in one row correspond to the magnetic poles in the other row one by one, and an axis of a magnetic core 21 in the magnetic pole is perpendicular to the surface of the magnetic yoke 1 facing the guide plate 11. The magnetic poles include a first magnetic pole 2 and a second magnetic pole 3, the first magnetic pole 2 and the second magnetic pole 3 in a row are arranged alternatively, the first magnetic pole 2 in any row is adjacent to the second magnetic pole 3 in the other row, the first magnetic poles 2 in a row are connected in series with each other and connected to a one-way output controller 4, and the second magnetic poles 3 in a row are connected in series with each other and connected to a bidirectional output controller 5. In a guiding state, magnetic poles in a row have a same polarity, and a polarity of magnetic poles in one row is opposite to a polarity of magnetic poles in the other row; a current output by the bidirectional output controller 5 in a braking state has a direction opposite to a current output by the bidirectional output controller in the guiding state.

In the normal guiding state, a magnetic field is generated between adjacent magnetic poles in different rows due to their different polarities, thus a guiding force with a direction perpendicular to a forwarding direction of the train is generated between the magnetic poles and the guiding plate 11 for guiding. When a braking operation is required, the bidirectional output controller 5 outputs a reverse current, and in this case the polarity of the second magnetic pole 3 will be reversed. Since the first magnetic pole 2 in any row is adjacent to the second magnetic pole 3 in the other row, and the first magnetic pole 2 and the second magnetic pole 3 in a row are alternately arranged, alternate polarities N and S along the forwarding direction of the train are formed, and a magnetic field is generated, thus a braking force for braking the train is generated. During the braking operation, polarities of adjacent magnetic poles in different rows become the same, thus no interference will occur. In this way, by integrating the braking function and the guiding function into one integrated electromagnet, resource waste of brake electromagnets can be greatly reduced.

A specific structure of the integrated electromagnet according to the embodiment of the present disclosure will be described in detail in the following embodiments.

Figure 9:
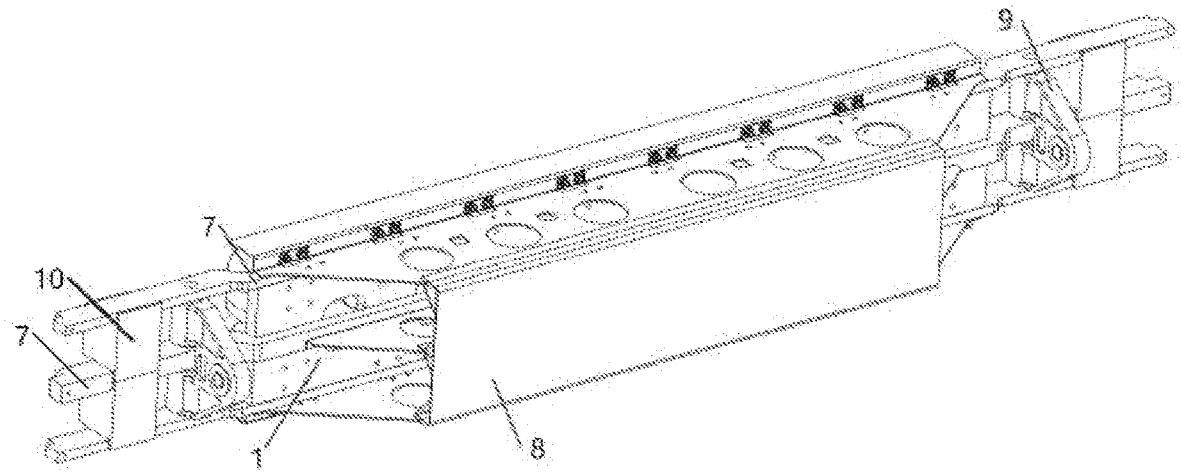
FIG. 9 is a schematic structural diagram of an integrated electromagnet according to an embodiment of the present disclosure.

Reference is made to FIG. 9, which is a schematic structural diagram of an integrated electromagnet according to an embodiment of the present disclosure.

Different from the above-mentioned embodiments of the present disclosure, a specific structure of the integrated electromagnet is introduced in this embodiment of the present disclosure on the basis of the above-mentioned embodiments of the present disclosure. Other contents regarding the integrated electromagnet have been introduced in detail in the above-mentioned embodiments, which will not be described again herein.

Referring to FIG. 9, in this embodiment, a wear plate 6 is provided on a side surface of the magnetic poles facing the guide plate 11. The wear plate 6 is usually riveted to the side surface of the magnetic poles facing the guide plate 11 by a rivet. A material of the wear plate 6 is usually tin bronze, which protects the magnetic poles and avoids the magnetic poles from being damaged due to mechanical contact between the electromagnet and the guide plate 11 under special circumstances. The thickness of the wear plate 6 is usually not more than 6 mm. It should be noted that other materials may also be used as the material of the wear plate 6, as long as it can protect the magnetic poles from mechanical collision damage. It should be noted that the wear plate 6 is usually made of a non-magnetic material, to avoid that the magnetic field generated by the magnetic poles does not pass through the air gap and thus not act on the guide plate 11. The magnetic poles are divided into two rows. Correspondingly, the wear plate 6 may be one piece that is arranged on the surface of the two rows of magnetic poles facing the guide plate 11; or, the wear plate 6 may also be divided into two pieces, and each wear plate 6 is arranged separately on a side surface of one row of magnetic poles facing the guide plate 11. Alternatively, the wear plate 6 may be in other shapes, and the specific shape of the wear plate 6 is not specifically limited in the embodiment of the present disclosure.

In the embodiment of the present disclosure, the magnetic yoke 1 is fixedly connected with three load-bearing battens 7, the three load-bearing battens 7 are parallel to each other, and an axis of the load-bearing batten 7 is parallel to an arrangement direction of the magnetic poles in a row. Generally, the load-bearing battens 7 include an upper load-bearing batten, a middle load-bearing batten and a lower load-bearing batten. The upper load-bearing batten and the lower load-bearing batten are usually arranged on an upper side and a lower side of the magnetic yoke 1, and the middle load-bearing batten is usually arranged on a surface of the magnetic yoke 1 facing away from the guide plate 11 along the axis of the magnetic yoke 1. The three load-bearing battens 7 are fixedly connected to the magnetic yoke 1, and are usually fixed to the magnetic yoke 1 by a bolt. The load-bearing battens 7 are mainly used for load-bearing in the embodiment of the present disclosure. A magnetic force between the magnetic poles and the guide plate 11 will be transmitted to the load-bearing battens 7 via the magnetic yoke 1. In the embodiment of the present disclosure, the load-bearing battens 7 only play the role of force transmission, support and installation. The load-bearing battens 7 are compatible with an arm structure of the existing maglev train, and can transmit the force generated by the magnetic poles to the train.

In the embodiment of the present disclosure, the integrated electromagnet further includes a Y-direction connection subassembly 9, and each Y-direction connection subassembly 9 is fixedly connected to surfaces of the three load-bearing battens 7 facing away from the guide plate 11. Generally, an integrated electromagnet is provided with two Y-direction connection subassemblies 9 which are respectively located at two ends of the integrated electromagnet. In order to ensure that more force generated by the magnetic poles can be transmitted to the train, each Y-direction connection subassembly 9 spans the three load-bearing battens 7, and is fixedly connected to the surfaces of the three load-bearing battens 7 facing away from the guide plate 11. In the embodiment of the present disclosure, the integrated electromagnet is connected to the train through the Y-direction connection subassembly 9, and the force generated between the magnetic poles and the guide plate 11 is transmitted to the train through the Y-direction connection subassembly 9.

In the embodiment of the present disclosure, a back box 8 is provided on a side of the magnetic yoke 1 facing away from the guide plate 11, and the back box 8 is fixedly connected to the load-bearing battens 7. The back box 8 is arranged on the side of the magnetic yoke 1 facing away from the guide plate 11, and is mainly used for accommodating components such as wires connected to the electromagnet. Specifically, the back box 8 usually includes an upper cover plate, a lower cover plate, a middle cover plate and a rear cover plate. The upper cover plate is usually fixedly connected to the upper load-bearing batten by a bolt. The middle cover plate is usually fixedly connected to the middle load-bearing batten by a bolt. The lower cover plate is usually fixedly connected to the middle load-bearing batten by a bolt. And the rear cover plate is usually riveted to the upper cover plate, the lower cover plate and the middle cover plate by rivets, to form the back box 8. The back box 8 can increase the strength of the integrated electromagnet, and avoid great deformation of the integrated electromagnet under the action of the guiding force and braking force. Furthermore, the back box 8, serving as an installation carrier for connection cables of the magnetic poles, can protect the cables from being damaged. A power supply cable connector (not shown in the figure) is usually fixed to the upper cover plate and the lower cover plate of the back box 8. The material of the upper cover plate, lower cover plate, middle cover plate and rear cover plate is usually aluminum alloy. However the material of the back box 8 is not limited in the embodiment of the present disclosure, which depends on specific situations. Preferably, the material of the back box 8 is a non-magnetic material with low weight and high strength.

In the embodiment of the present disclosure, the integrated electromagnet is usually provided with four gap sensors 10 between the load-bearing battens 7. The gap sensor 10 is usually fixed between adjacent load-bearing battens 7 by a bolt, and is fixed to the load-bearing battens 7. The gap sensors 10 are mainly used for detecting a gap between the integrated electromagnet and the guide plate 11, which is functioned as a feedback of a closed-loop control system. A detection surface of the gap sensors 10 generally are 4 mm to 6 mm lower than a surface of the wear plate 6, to avoid damage to the gap sensors 10 when the integrated electromagnet is in contact with the guide plate 11.

According to the integrated electromagnet provided by the embodiment of the present disclosure, damage to the magnetic poles due to mechanical contact between the electromagnet and the guide plate 11 under special circumstances can be avoided by providing the wear plate 6. In addition, by providing the back box 8, the strength of the integrated electromagnet is increased, and great deformation of the integrated electromagnet under the action of the guiding force and braking force is avoided. Furthermore, the back box 8, serving as an installation carrier for connection cables of the magnetic poles, can protect the cables from being damaged.

A specific structure of the integrated electromagnet according to an embodiment of the present disclosure will be described in detail in the following embodiments.

Figure 10:
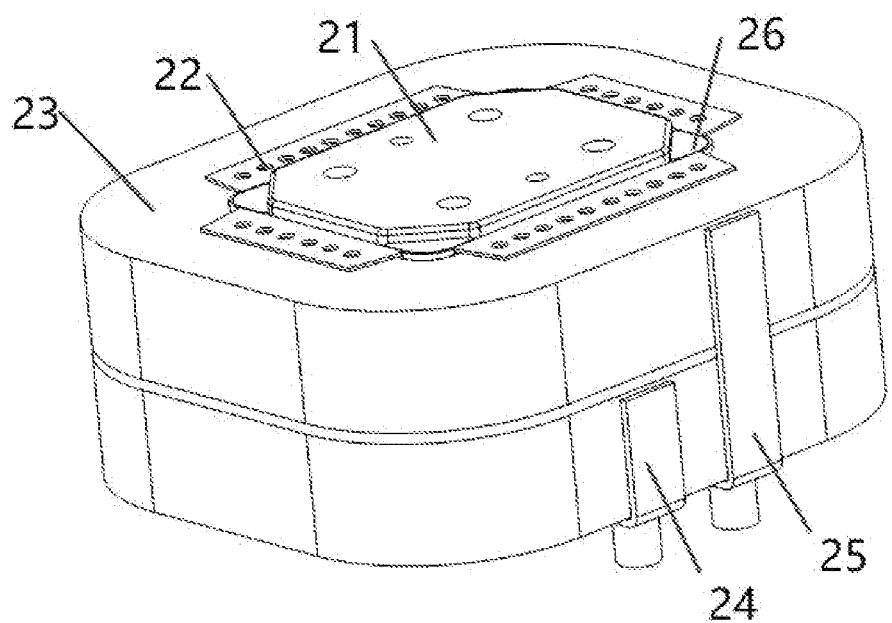
FIG. 10 is a schematic structural diagram of a magnetic pole according to an embodiment of the present disclosure.

Reference is made to FIG. 10, which is a schematic structural diagram of a magnetic pole according to an embodiment of the present disclosure.

Different from the above-mentioned embodiments of the present disclosure, a specific structure of a magnetic pole in the integrated electromagnet is introduced in this embodiment of the present disclosure on the basis of the above-mentioned embodiments of the present disclosure. Other contents regarding the integrated electromagnet have been introduced in detail in the above-mentioned embodiments, which will not be described again herein.

Referring to FIG. 10, in the embodiment of the present disclosure, a cross section of the magnetic pole along a direction perpendicular to the axis of the magnetic core 21 is in a rounded square shape, and the magnetic pole includes a magnetic core 21, a winding 23, an insulating layer 22, a short interface 24 and a long interface 25. The insulating layer 22 covers a side wall of the insulating layer 22, and the winding 23 is wound around the magnetic core 21 along a surface of the insulating layer 22 facing away from the magnetic core 21; the short interface 24 is electrically connected to one port of the winding 23, the long interface 25 is electrically connected to the other port of the winding 23, and both the short interface 24 and the long interface 25 extend to one end surface of the magnetic pole along the axis of the magnetic core 21.

The axis of the magnetic core 21 is perpendicular to the surface of the magnetic yoke 1 facing the guide plate 11, and the winding 23 is wound around the axis of the magnetic core 21 and therefore wound around on the surface of the magnetic core 21. In the embodiment of the present disclosure, the cross section of the magnetic pole in the direction perpendicular to the axis of the magnetic core 21 is in the rounded square shape, thus the length and width of the magnetic pole are substantially equal. The insulating layer 22 covers the side wall of the magnetic core 21, and the insulating layer 22 is mainly used for preventing a short circuit between the winding 23 and the magnetic core 21 from damaging the magnetic pole. The winding 23 is wound around the magnetic core 21 along the surface of the insulating layer 22 facing away from the magnetic core 21, to form the magnetic pole. A specific winding direction of the winding 23 is not specifically limited in the embodiment of the present disclosure, which depends on specific situations. The winding 23 has two ports for electrical connection with other components. In the embodiment of the present disclosure, one port is usually welded to the short interface 24 to achieve electrical connection, and the other port is welded to the long interface 25 to achieve electrical connection. Both the long interface 25 and the short interface 24 extend to one end of the magnetic pole along the direction of the axis of the magnetic pole on the surface of the winding 23, such that the long interface 25 and the short interface 24 can extend to the back box 8 to connect with wires in the back box 8 when the magnetic pole is installed in the integrated electromagnet according to the above-mentioned embodiments of the present disclosure.

In an embodiment of the present disclosure, a cross section of the magnetic core 21 in the direction perpendicular to the axis of the magnetic core 21 is in a chamfered square shape, and the magnetic pole further includes an insulating support block 26. The insulating support block 26 is located at four corners of the magnetic core 21, and the insulating layer 22 covers the magnetic core 21 and the insulating support block 26. The cross section of the magnetic core 21 in the direction perpendicular to the axis of the magnetic core 21 is in the chamfered square shape. To facilitate the arrangement of the insulating layer 22, the insulating support block 26 is provided at four corners of the magnetic core 21, and the shape of the insulating support block 26 corresponds to the shape of the magnetic core 21, to support the insulating layer 22. Correspondingly, the insulating layer 22 covers the magnetic core 21 and the insulating support block 26.

Specifically, in an embodiment of the present disclosure, the winding 23 is usually in a double-layer structure. The double-layer winding 23 is beneficial to increase the filling rate of the winding 23, thereby improving the guiding and braking ability, and reducing the heating of the winding 23 as well. The winding 23 is usually composed of two materials distributed alternately, one layer of which is usually aluminum foil, and the other layer is usually an insulating film. The specific structure and material of the winding 23 are not specifically limited in the embodiment of the present disclosure, which depend on specific situations. In an embodiment of the present disclosure, epoxy resin is usually poured on the surface of the magnetic pole, and the epoxy resin can protect the internal structure of the magnetic pole and prevent the magnetic pole from being damaged by a short circuit due to moisture.

A maglev train is also provided according to an embodiment of the present disclosure. The maglev train is specifically provided with the integrated electromagnet according to any of the above-mentioned embodiments. Details of the integrated electromagnet may refer to the above-mentioned embodiments of the present disclosure, and other structures of the maglev train may refer to the prior art, which will not be described again herein.

In the maglev train according to the embodiment of the present disclosure, the braking function and the guiding function are integrated in one integrated electromagnet, thus the electromagnet can share one set of control system and power supply system, therefore greatly reducing waste of brake electromagnet resources.

The above embodiments in the specification are described in a progressive manner. Each of the embodiments is mainly focused on describing its differences from other embodiments, and references may be made among these embodiments with respect to the same or similar portions among these embodiments.

The person skilled in the art can further appreciate that the elements and algorithm steps of each embodiment described in connection with the embodiments disclosed herein can be implemented in electronic hardware, computer software or a combination of both, in order to clearly illustrate the interchangeability of the hardware and software, the composition and steps of the various examples have been generally described in terms of function in the above description. Whether these functions are performed in hardware or software depends on the specific application and design constraints of the technical solution. The person skilled in the art can use different methods for implementing the described functions for each particular application; such implementation should not be considered to be beyond the scope of the present disclosure.

The steps of the method or algorithm described according to the embodiments disclosed herein can be implemented in forms of hardware, a software module executed by a processor or the combination of the both. The software module may be stored in a Random Access Memory (RAM), a memory, a Read-Only Memory (ROM), an electrically programmable ROM, an electrically erasable programmable ROM, a register, a hardware disk, a movable magnetic disk, CD-ROM or any other forms of storage medium well known in the art.

It should be further noted that, the relationship terminologies such as "first", "second" and the like are only used herein to distinguish one entity or operation from another, rather than to necessitate or imply that the actual relationship or order exists between the entities or operations. Further, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n) . . . " in which an element is defined will not preclude presence of an additional identical element(s) in a process, method, article or device comprising the defined element(s) unless further defined.

The integrated electromagnet and the maglev train according to embodiments of the present disclosure are introduced in detail above. The principles and embodiments of present disclosure are described by specific embodiments in the specification. The above description for embodiments is only for helping to understand the method and key idea of the present disclosure. It should be pointed out that for the person skilled in the art, several improvements and modifications can be made to the present disclosure without departing from the principle of the present disclosure, and these improvements and modifications also fall within the protection scope covered by the claims of the present disclosure.

The invention claimed is:

1. An integrated electromagnet, comprising a magnetic yoke and magnetic poles in two rows that are located on a surface of the magnetic yoke facing a guide plate, the magnetic poles in one row correspond to the magnetic poles in the other row one by one, and an axis of a magnetic core in the magnetic pole is perpendicular to the surface of the magnetic yoke facing the guide plate;

wherein the magnetic poles comprise a first magnetic pole and a second magnetic pole, the first magnetic pole and the second magnetic pole in a row are arranged alternately, the first magnetic pole in any row is adjacent to the second magnetic pole in the other row, the first magnetic poles in a row are connected in series with each other and connected to a one-way output controller, and the second magnetic poles in a row are connected in series with each other and connected to a bidirectional output controller; and wherein in a guiding state, the magnetic poles in a row have a same polarity, and a polarity of the magnetic poles in one row is opposite to a polarity of the magnetic poles in the other row; a current output by the bidirectional output controller in a braking state has a direction opposite to a current output by the bidirectional output controller in the guiding state, wherein a cross section of the magnetic pole along a direction perpendicular to the axis of the magnetic core is in a rounded square shape, and the magnetic pole comprises the magnetic core, a winding, an insulating layer, a short interface and a long interface;

wherein the insulating layer covers a side wall of the insulating layer, the winding is wound around the magnetic core along a surface of the insulating layer facing away from the magnetic core; the short interface is electrically connected to one port of the winding, the long interface is electrically connected to the other port of the winding, and both the short interface and the long interface extend to one end surface of the magnetic pole along the axis of the magnetic core, wherein a cross section of the magnetic core along a direction perpendicular to the axis of the magnetic core is in a chamfered square shape, and the magnetic pole further comprises an insulating support block; wherein the insulating support block is located at four corners of the magnetic core, and the insulating layer covers the magnetic core and the insulating support block.

2. The integrated electromagnet according to claim 1, wherein the first magnetic pole and the second magnetic pole in a row are alternately arranged one by one.

3. The integrated electromagnet according to claim 2, wherein the number of the magnetic poles in a row is an even number.

4. The integrated electromagnet according to claim 1, wherein a wear plate is provided on a surface of the magnetic poles facing the guide plate.

5. The integrated electromagnet according to claim 4, wherein the magnetic yoke is fixedly connected with three load-bearing battens, the three load-bearing battens are parallel to each other, and an axis of the load-bearing batten is parallel to an arrangement direction of the magnetic poles in a row.

6. The integrated electromagnet according to claim 5, wherein a back box is provided on a side of the magnetic yoke facing away from the guide plate, and the back box is fixedly connected to the load-bearing battens.

7. The integrated electromagnet according to claim 6, further comprising a Y-direction connection subassembly, wherein each Y-direction connection subassembly is fixedly connected to surfaces of the three load-bearing battens facing away from the guide plate.

8. A maglev train, comprising the integrated electromagnet according to claim 1.

* * * * *